Aug. 23, 1960 M. FALCO 2,949,629
DEVICE FOR MOLDING MEAT BALLS
Filed Sept. 5, 1958 3 Sheets-Sheet 1
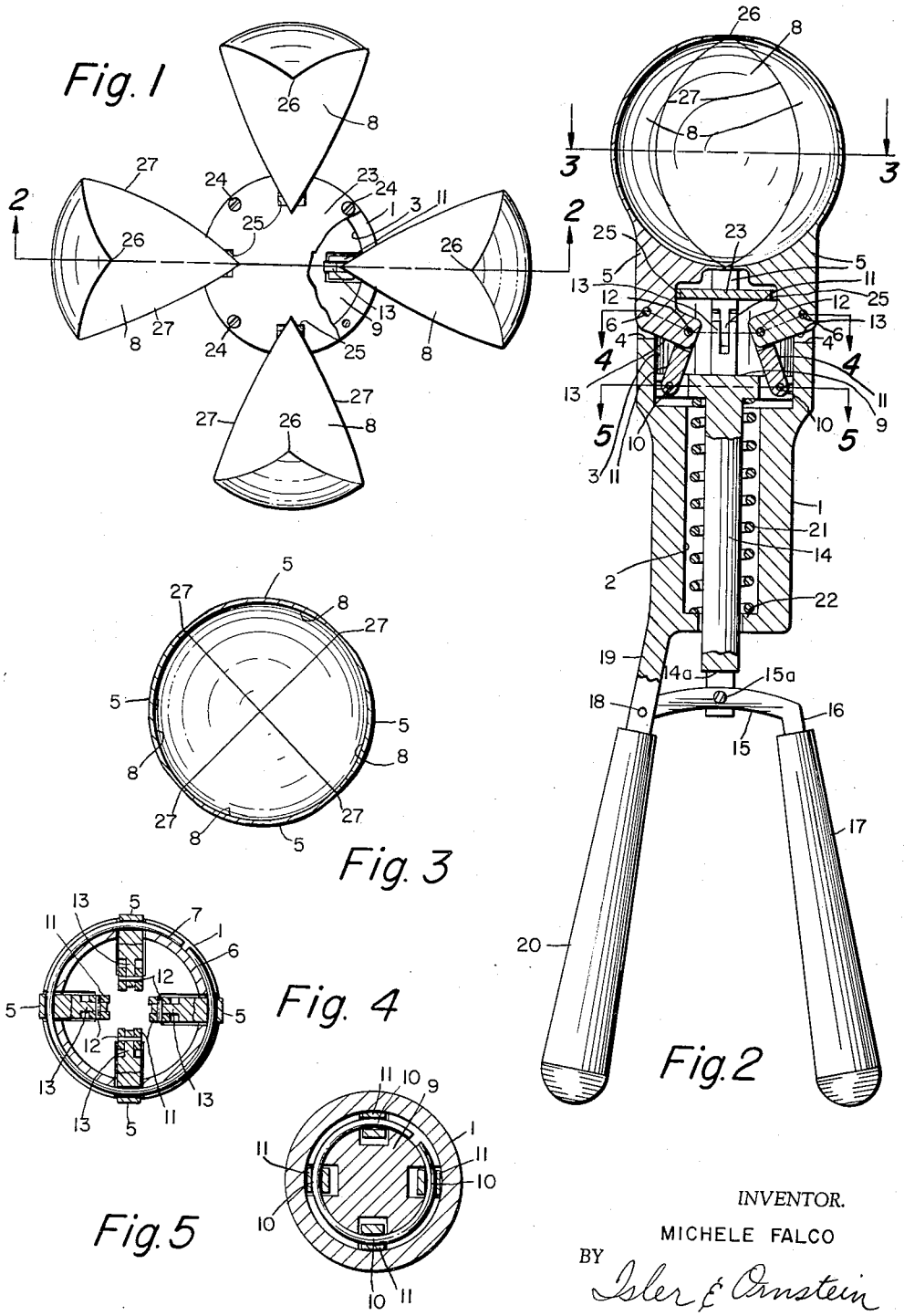
INVENTOR.
MICHELE FALCO
BY Isler & Ornstein
ATTORNEYS

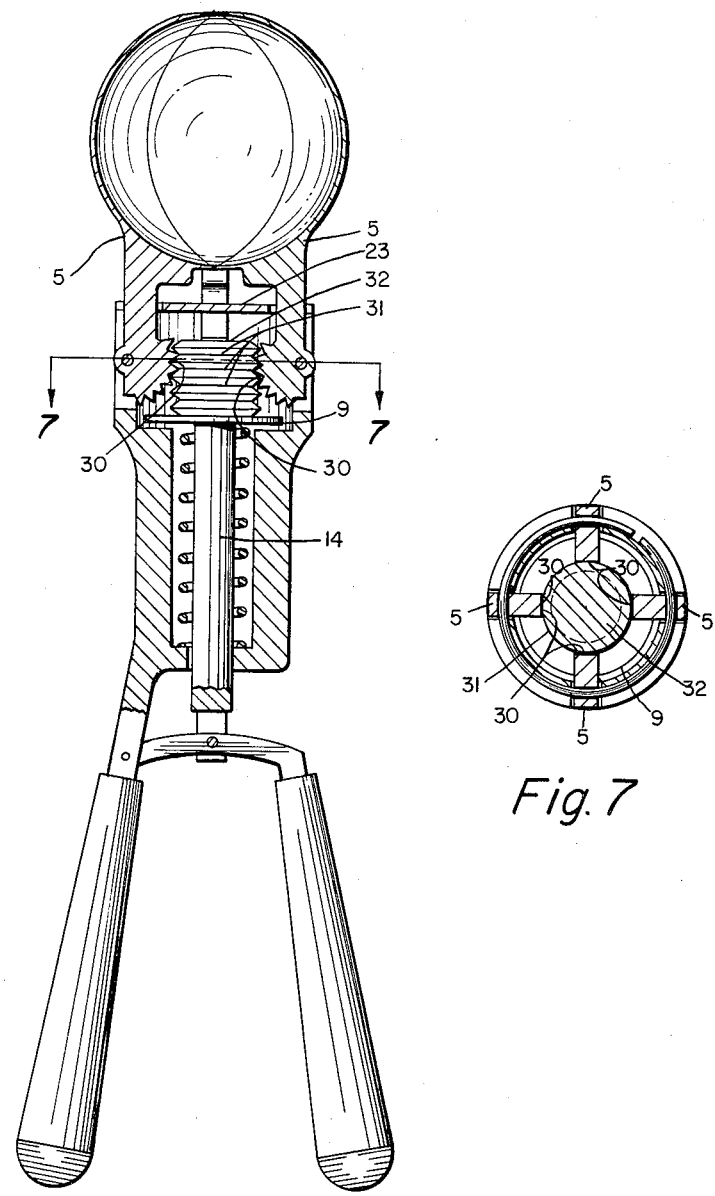

Aug. 23, 1960   M. FALCO   2,949,629
DEVICE FOR MOLDING MEAT BALLS
Filed Sept. 5, 1958   3 Sheets-Sheet 3

INVENTOR.
MICHELE FALCO
BY *Isler & Ornstein*
ATTORNEYS

United States Patent Office 2,949,629
Patented Aug. 23, 1960

2,949,629

DEVICE FOR MOLDING MEAT BALLS

Michele Falco, 296 Liberty St., Painesville, Ohio

Filed Sept. 5, 1958, Ser. No. 759,274

4 Claims. (Cl. 17—32)

This invention relates generally to devices for molding edible products but has reference more particularly to devices for molding or making meat balls and the like.

Devices of this general nature have heretofore been proposed, such as ice cream scoops, but owing to the physical characteristice of meat and mixtures of meats from which meat balls are usually molded, the use of such devices for molding or making meat balls has not proved satisfactory, and it is therefore still customary to make or mold meat balls by hand rolling, which is a slow, laborious and unsanitary method.

The failure of such devices for molding meat balls stems from two things (1) in cases where the devices can be easily inserted into the meat mixtures, there is little or no provision for stripping or removing the molded meat ball from the device, and (2) in cases where some provision is made for removing or stripping the meat balls from the device, there is little or no provision for easily inserting the device into the meat mixtures to scoop out a desired quantity of meat to form the meat ball.

The present invention has as its primary object the provision of a device of this character which is so constructed as to readily accomplish both functions necessary to the making or molding of meat balls, as indicated in the preceding paragraph.

Another object of the invention is to provide a device, or devices of the character described, which can be easily manipulated with one hand, and which can be used in a highly efficient manner to rapidly make or mold meat balls of uniform size and proper consistency or texture.

A further object of the invention is to provide a device or devices of the character described which consists of a minimum number of easily manufactured parts, which can be quickly assembled or disassembled for cleaning or replacement of parts.

Other objects and advantages of my invention will be apparent during the course of the following description.

In the accompanying drawings forming a part of this specification, and in which like numerals are employed to designate like parts throughout the same, Fig. 1 is a top plan view of one form of the device, with the molding elements thereof in the fully open position;

Fig. 2 is a cross-sectional view, taken on the line 2—2 of Fig. 1, but with the molding elements in closed position;

Fig. 3 is a cross-sectional view, taken on the line 3—3 of Fig. 2;

Fig. 4 is a cross-sectional view, taken on the line 4—4 of Fig. 2;

Fig. 5 is a cross-sectional view, taken on the line 5—5, of Fig. 2;

Fig. 6 is a view similar to Fig. 2, but of a modification of the device;

Fig. 7 is a cross-sectional view, taken on the line 7—7 of Fig. 6.

Figure 8:
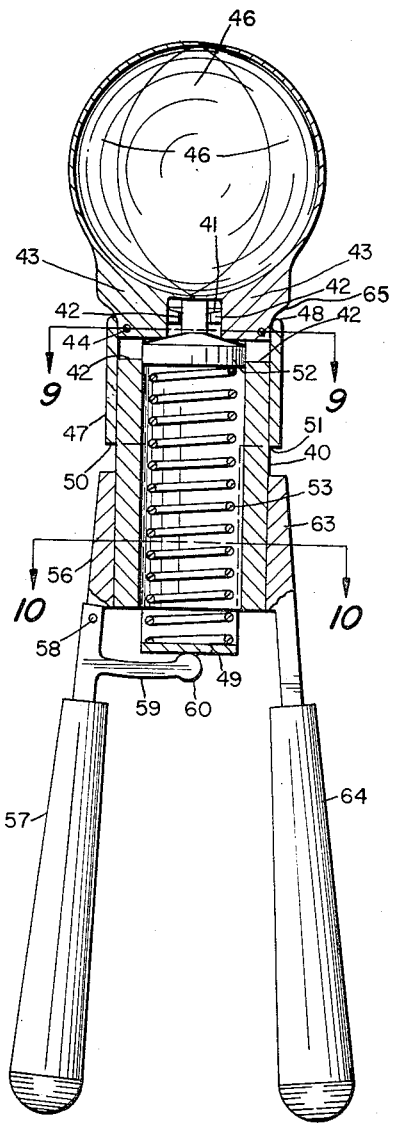
Fig. 8 is a view similar to Fig. 2, but of another modification of the device.
Figure 9:
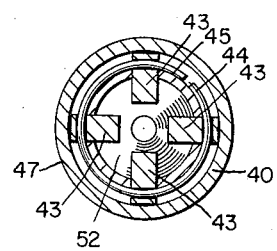
Fig. 9 is a cross-sectional view, taken on the line 9—9 of Fig. 8.

Referring more particularly to Figs. 1 to 5 inclusive of the drawings, the device will be seen to comprise a cylindrical housing 1 having an axial bore 2, which is counterbored, as at 3, for the reception of parts of the mechanism to be presently described.

The housing 1 is provided at its upper end with four slots or recesses 4, which are spaced circumferentially 90 degrees apart, and in which elements 5 are mounted for pivotal movement. These elements 5 are mounted for pivotal movement about a snap ring 6, which is disposed in an annular recess 7 in the outer wall of the housing 1, and each element is formed to provide a surface 8, which is in the form of a quadrant of a hollow sphere.

These surfaces 8 are movable about their pivots from an open position in which they are separated from each other in the manner shown in Fig. 1, to a closed position, as shown in Fig. 2, in which the quadrants meet at their edges to form a hollow sphere.

For the purpose of moving the surfaces 8 from the open to the closed position, means have been provided, comprising a disc 9 which is reciprocably movable in the counterbore 3 of the housing 1, and has pivotally secured thereto, as at 10, links 11, which, in turn, are pivotally secured, as at 12, to ears 13 extending from the elements 5.

Extending downwardly from the disc 9, through the bore 2, is a central post 14, to the lower end of which a lever 15 is pivoted, as by means of a pivot pin 15a. The lever 15 is movable in a slot 14a in the lower end of the post 14. The lever 15 is provided with a downturned portion 16, to which a handle 17 is secured. One end of the lever 15 is secured, as by a pivot pin 18, to a member 19, which is formed integrally with the housing 1, and is provided with a handle 20.

For the purpose of automatically returning the elements 5 to their open position, a compression coil spring 21 is provided, which spring is interposed between the disc 9 and an annular shoulder 22 of the housing 1, which is provided at the lower end of the bore 2.

For the purpose of covering the upper end of the counterbore 3, so as to prevent ingress of meat into this bore, a cover plate 23 is provided, which is secured, as by screws 24 to the upper end of the housing, and is provided with circumferentially-spaced recesses 25 in its periphery, in which recesses the elements 5 are movable.

The use of the device for molding or making meat balls will be readily apparent from the construction of the device, but may be briefly described as follows.

The device is held in one hand by means of the handles 17 and 20, and with the elements 5 in the open position, these elements are pushed into the meat mixture which is to be molded, after which the handle 17 is squeezed by the hand toward the handle 20, thereby causing the elements 5 to move to the closed position, so as to cause the surfaces 8 to coact to mold or form the meat ball.

Due to the provision of the points 26 and relatively sharp edges 27 provided by the surfaces 8 when in open position, the elements can be easily plunged into the meat mixture, and the quantity of meat necessary to form the meat ball can thus be quickly and easily grasped. It may be noted, in this connection, that in the course of plunging the elements 5 into the meat mixture, and due to the shape or contour of these elements, there is virtually no compacting or compressing of the meat, so that the meat which is scooped out retains its original consistency and texture.

The device is then removed from the meat, and the grip on the handle 17 is released or relaxed to permit the surfaces 8, due to the action of the spring 21, to move to the open position, thereby releasing the meat ball from the device. It may be noted, in this connection, that due to the movement of the surfaces 8 about their pivotal axes, rather than about the center of the sphere formed by such surfaces, that these surfaces become quickly separated from each other, so that there is no tendency of the meat ball to adhere to these surfaces, and the meat ball is quickly, easily and efficiently ejected from the device, and without the possibility of any portions of the meat ball clinging to these surfaces.

Furthermore, since the surfaces 8 coact to form a fully-enclosed hollow sphere, there is no possibility for any portions of the meat ball to become extruded through the meeting edges of these surfaces, so that perfectly shaped and uniformly textured meat balls are formed at all times by the device.

The device is so constructed that it can be quickly and easily disassembled for cleaning purposes or for replacement of any damaged or worn parts.

In that form of the device shown in Figs. 6 and 7, the construction of the device is generally similar to that of the form described above, but in this case, the lower portions of the elements 5 are provided with gear sectors 30, which are in mesh with teeth or serrations 31 formed on an axial extension 32 of the disc 9, so that when the post 14 is pulled downwardly the elements 5 are actuated to their open position. This form of the device consists of an even smaller number of parts than the previously described form of the device, and is therefore advantageous from the viewpoint of cost and ease of assembly and disassembly.

Figure 10:
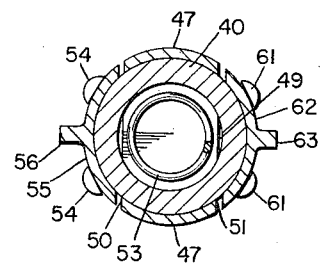
Fig. 10 is a cross-sectional view, taken on the line 10—10 of Fig. 8.

In that form of the device shown in Figs. 8 and 10 inclusive, the device will be seen to comprise a cylindrical housing 40 having flange 41 at its upper end, and the wall and flange are provided with four slots or recesses 42 which are spaced circumferentially 90 degrees apart. Mounted for pivotal movement in these slots are elements 43, which are generally similar to the elements 5 already described. These elements 43 are mounted for pivotal movement about a snap ring 44 which is disposed in an annular recess 45 in the outer wall of the housing 40, and each element is formed to provide a surface 46 which is in the form of a quadrant of a hollow sphere and is further provided with a camming surface 65 on its outer surface near its lower or pivotal end.

These surfaces 46 are movable about their pivots from an open position in which they are separated from each other in the manner shown in Fig. 1, to the closed position shown in Fig. 8, in which the quadrants meet at their edges to form a hollow sphere.

The housing 40 is open at the bottom, and is disposed within a cam closer comprising a cylindrical member 47 having an annular camming edge 48 at its upper end, a cross-piece 49 at its lower end, and openings 50 and 51 at its sides.

Disposed within the housing 40, adjacent its flange 41, is a plunger or disc 52, and interposed between this disc and the cross-piece 49 of the cam closer is a compression coil spring 53.

Secured to the housing 40, as by screws 54, is an arcuate plate 55 having an ear 56 to which a handle 57 is pivoted, as by means of a pivot pin 58. The handle is provided with a lever 59 having a rounded end 60 which underlies the cross-piece 49 of the cam closer.

Secured to the housing 40, at a point diametrically opposite the plate 55, as by screws 61, is a second arcuate plate 62, having an ear 63, to which a stationary handle 64 is secured.

In the use or operation of this form of the device, the device is held in one hand by means of the handles 57 and 64, and with the elements 43 in the open position, these elements are pushed into the meat mixture which is to be molded, after which the handle 57 is squeezed by the hand toward the handle 64, thereby causing the lever 59 to move the cam closer, so as to cause the camming edge 48 thereof to engage the camming surfaces 65 of the elements 43 and cause these elements to move to the closed position in which the surfaces 46 coact to mold or form the meat ball.

The device is then removed from the meat, and the grip on the handle 57 is released or relaxed to permit the surfaces 46, due to the action of the spring 53, to move to the open position, thereby releasing the meat ball from the device.

Although I have illustrated various devices in which I have employed four segments of a hollow sphere, any number of segments, not less than three, coacting to form a hollow sphere, may be used. With only two segments, there is a tendency to compress the meat mixture when scooping it out, and also a tendency for the meat ball to adhere to the segments when the meat ball is released. On the other hand, the use of an excessive number of segments is undesirable from the standpoint of cost and difficulty of assembly. The use of four segments represents an optimum.

It is to be understood that the forms of my invention, herewith shown and described, are to be taken as preferred examples of the same, and that various changes may be made in the shape, size and arrangement of parts thereof, without departing from the spirit of the invention or the scope of the subjoined claims.

Having thus described my invention, I claim:

1. In a device for making meat balls, a cylindrical housing, a plurality of segments, not less than three in number, coacting when in a closed position, to form a hollow sphere, said segments being pivotally mounted on one end of said housing for movement between open and closed positions of said segments, each of said segments including a camming surface, a cylindrical member carried by and coaxially disposed about said housing and slidable axially relatively to said housing and having a camming edge at its upper end, spaced handles connected to said housing, and means associated with one of said handles for advancing said cylindrical member axially of said housing to cause said camming edge to coact with said camming surfaces of said segments to move said segments to the closed position.

2. A device, as defined in claim 1, in which said cylindrical member supports a cross-piece, a plunger is provided in the upper end of the cylindrical housing, and a compression coil spring is provided below said plunger, said spring being effective to move the segments to their open position when said cylindrical member is retracted.

3. A device, as defined in claim 2, in which said plunger bears directly against the lower ends of said segments.

4. A device, as defined in claim 3, in which said means associated with said one handle includes a lever which extends to and under said cross piece of said cylindrical member to move said cross-piece axially of said housing.

References Cited in the file of this patent

UNITED STATES PATENTS

| 1,540,089 | Schmelter | June 2, 1925 |
| 1,562,432 | Bersch | Nov. 24, 1925 |
| 1,584,757 | Dow | May 18, 1926 |
| 1,885,377 | Robinson | Nov. 1, 1932 |
| 2,108,585 | Healy | Feb. 15, 1938 |

FOREIGN PATENTS

| 96,423 | Germany | Mar. 12, 1898 |